(12) United States Patent
Lymberopoulos et al.

(10) Patent No.: US 11,885,193 B2
(45) Date of Patent: Jan. 30, 2024

(54) SPOOL ASSEMBLIES AND RELATED METHODS FOR FLUIDLY CONNECTING WELLHEADS

(71) Applicant: SAFOCO, INC., Houston, TX (US)

(72) Inventors: David Lymberopoulos, Houston, TX (US); Andrew Allen Kadavy, Houston, TX (US)

(73) Assignee: SAFOCO, INC., Houston, TX (US)

( * ) Notice: Subject to any disclaimer, the term of this patent is extended or adjusted under 35 U.S.C. 154(b) by 73 days.

(21) Appl. No.: 17/592,051

(22) Filed: Feb. 3, 2022

(65) Prior Publication Data

US 2023/0243226 A1    Aug. 3, 2023

(51) Int. Cl.
*E21B 33/03* (2006.01)

(52) U.S. Cl.
CPC .................................... *E21B 33/03* (2013.01)

(58) Field of Classification Search
CPC .......... E21B 33/03; E21B 17/02; E21B 33/04; F16L 27/00; F16L 27/02; F16L 49/08
See application file for complete search history.

(56) References Cited

U.S. PATENT DOCUMENTS

| | | | | |
|---|---|---|---|---|
| 4,603,887 A | * | 8/1986 | Mayfield | E21B 43/2607 285/298 |
| 4,618,173 A | * | 10/1986 | Dopyera | F16L 27/053 285/263 |
| 5,383,738 A | * | 1/1995 | Herbermann | F21V 21/29 403/56 |
| 6,003,604 A | * | 12/1999 | Wilkins | F16L 27/053 166/344 |
| 8,839,867 B2 | * | 9/2014 | Conrad | E21B 34/14 166/308.1 |
| 8,905,056 B2 | * | 12/2014 | Kendrick | F04B 23/06 137/15.01 |
| 9,103,465 B2 | | 8/2015 | Lymberopoulos | |
| 9,163,619 B2 | | 10/2015 | Lymberopoulos | |
| 9,441,453 B2 | | 9/2016 | Lymberopoulos et al. | |
| 9,671,794 B1 | | 6/2017 | Lymberopoulos et al. | |
| 9,890,609 B2 | | 2/2018 | Lymberopoulos et al. | |
| 10,323,475 B2 | * | 6/2019 | Christopherson | E21B 34/02 |
| 10,480,300 B2 | * | 11/2019 | Guidry | E21B 43/26 |
| 10,787,879 B2 | * | 9/2020 | Christopherson | E21B 43/26 |
| 11,384,876 B2 | | 7/2022 | Kadavy | |

(Continued)

*Primary Examiner* — Daniel P Stephenson
(74) *Attorney, Agent, or Firm* — Patterson + Sheridan, LLP (57) ABSTRACT

Aspects of the present disclosure relate to spool assembly implementations and related methods for fluidly connecting wellheads. In one implementation, a spool assembly for fluidly connecting wellheads includes a first end flange, a second end flange, and one or more pivotable connections positioned between the first end flange and the second end flange. Each respective pivotable connection of the one or more pivotable connections includes a connection tubular having an outer spherical surface, and a bearing tubular having a spherical end disposed about the outer spherical surface of the connection tubular. Each respective pivotable connection of the one or more pivotable connections includes a socket flange tubular disposed about the spherical end of the bearing tubular, and a shoulder flange tubular disposed about an outer shoulder of the connection tubular. The shoulder flange tubular is coupled to the socket flange tubular.

20 Claims, 4 Drawing Sheets

(56) References Cited

U.S. PATENT DOCUMENTS

| | | | |
|---|---|---|---|
| 11,428,070 B2* | 8/2022 | Webster | E21B 34/02 |
| 11,506,006 B2 | 11/2022 | Lymberopoulos et al. | |
| 11,519,536 B2 | 12/2022 | Lymberopoulos et al. | |
| 11,530,601 B2 | 12/2022 | Lymberopoulos et al. | |
| 2013/0175038 A1* | 7/2013 | Conrad | F16L 27/12751 |
| | | | 166/308.1 |
| 2017/0037717 A1* | 2/2017 | Oehring | F04B 19/22 |
| 2020/0399979 A1* | 12/2020 | Webster | E21B 34/025 |
| 2021/0131247 A1* | 5/2021 | Ungchusri | E21B 43/26 |
| 2022/0065050 A1* | 3/2022 | Massey | E21B 17/05 |

* cited by examiner

SPOOL ASSEMBLIES AND RELATED METHODS FOR FLUIDLY CONNECTING WELLHEADS

BACKGROUND

Field

Aspects of the present disclosure relate to spool assembly implementations and related methods for fluidly connecting wellheads. In one aspect, the spool assembly includes one or more pivotable connections to shorten a length of the spool assembly.

Description of the Related Art

Spool assemblies that connect wellheads can be heavy and difficult to transport. Spool assemblies can also fail to account for variances in distances and heights between wellheads, which can result in operational delays and increased costs. What is more, spool assemblies that attempt to account for variances in distances and heights can be expensive and more susceptible to operational conditions, such as abrasive materials flowing through the spool assemblies to the wellheads.

Therefore, there is a need in the art for spools that account for variances in wellhead spacing (e.g., distances and/or heights between wellheads) while facilitating reduced costs, reduced weight, ease of transportation, and resilience to operational conditions.

SUMMARY

Aspects of the present disclosure relate to spool assembly implementations and related methods for fluidly connecting wellheads. In one aspect, the spool assembly includes one or more pivotable connections to shorten a length of the spool assembly.

In one implementation, a spool assembly for fluidly connecting wellheads includes a first end tubular, a second end tubular, and a first pivotable connection positioned between the first end tubular and the second end tubular. The first pivotable connection includes a first bearing tubular, and a first connection tubular interfacing with the first bearing tubular. The spool assembly includes one or more first intermediate tubulars positioned between the first pivotable connection and the first end tubular, and a second pivotable connection positioned between the first end tubular and the second end tubular. The second pivotable connection includes a second connection tubular, and a second bearing tubular interfacing with the second connection tubular. The spool assembly includes one or more second intermediate tubulars positioned between the second pivotable connection and the second end tubular.

In one implementation, a spool assembly for fluidly connecting wellheads includes a first end flange, a second end flange, and one or more pivotable connections positioned between the first end flange and the second end flange. Each respective pivotable connection of the one or more pivotable connections includes a connection tubular having an outer spherical surface, and a bearing tubular having a spherical end disposed about the outer spherical surface of the connection tubular. Each respective pivotable connection of the one or more pivotable connections includes a socket flange tubular disposed about the spherical end of the bearing tubular, and a shoulder flange tubular disposed about an outer shoulder of the connection tubular. The shoulder flange tubular is coupled to the socket flange tubular.

In one implementation, a method of installing a spool assembly at a wellsite includes positioning the spool assembly adjacent a first wellhead structure and a second wellhead structure, and pivoting a first pivotable connection of the spool assembly to shorten a length between a first end flange and a second end flange of the spool assembly. The method includes coupling the first end flange of the spool assembly to the first wellhead structure, and pivoting a second pivotable connection of the spool assembly to further shorten the length. The method includes coupling the second end flange of the spool assembly to the second wellhead structure.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to spool assembly implementations and related methods for fluidly connecting wellheads. In one aspect, the spool assembly includes one or more pivotable connections to shorten a length of the spool assembly.

The disclosure contemplates that terms such as "couples," "coupling," "couple," and "coupled" may include but are not limited to welding, interference fitting, and/or fastening such as by using bolts, threaded connections, pins, and/or screws. The disclosure contemplates that terms such as "couples," "coupling," "couple," and "coupled" may include but are not limited to integrally forming. The disclosure contemplates that terms such as "couples," "coupling," "couple," and "coupled" may include but are not limited to direct coupling and/or indirect coupling, such as indirect coupling through components such as links.

Figure 1:
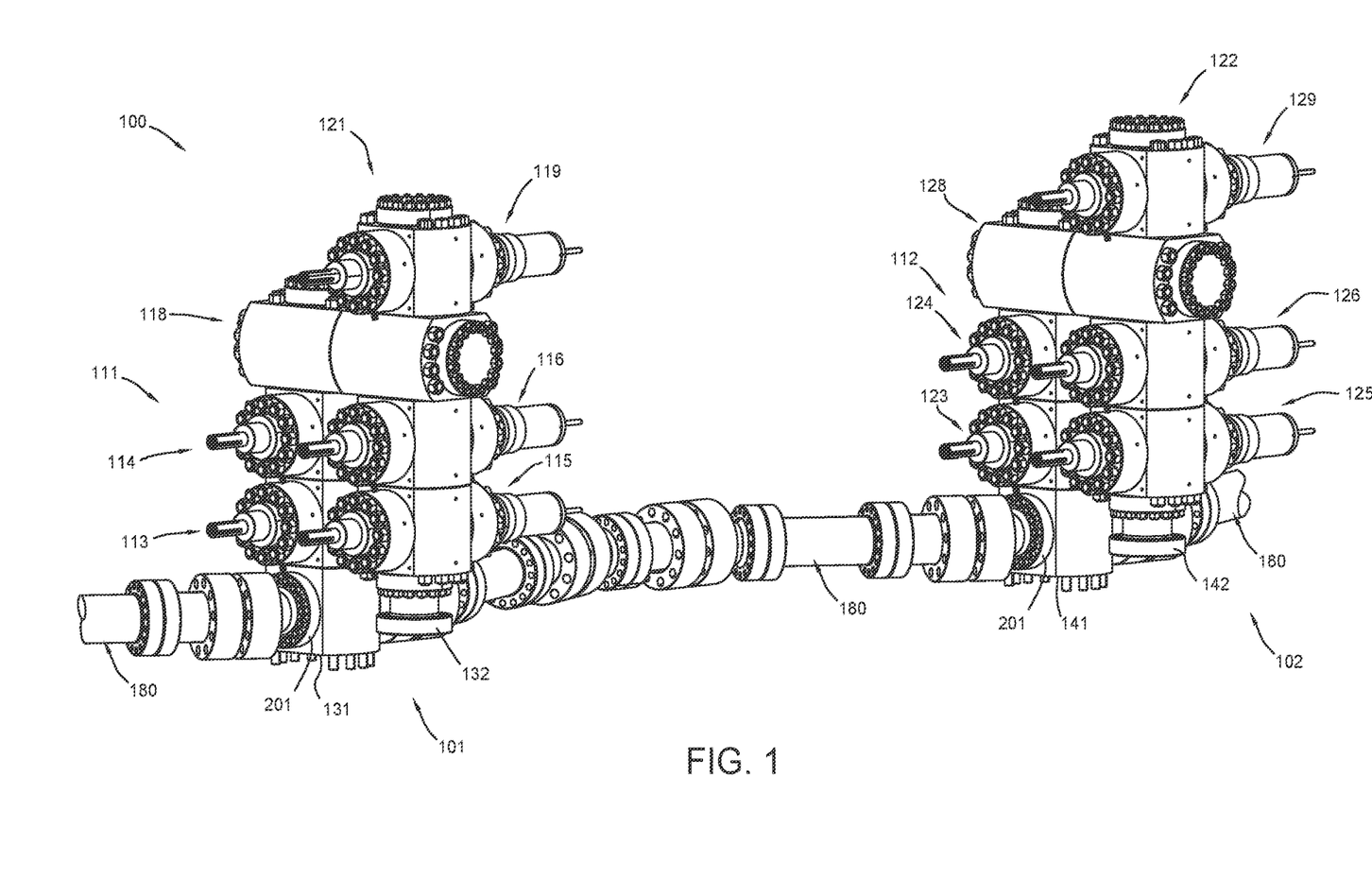
FIG. 1 is a schematic isometric view of a wellhead system having a plurality of wellhead structures at a wellsite, according to one implementation.

FIG. 1 is a schematic isometric view of a wellhead system 100 having a plurality of wellhead structures 101, 102 at a wellsite, according to one implementation. FIG. 1 shows two wellhead structures 101, 102. Each wellhead structure 101, 102 is fluidly connected to a respective well. Each wellhead structure 101, 102 includes a respective first valve assembly 111, 112 and a respective second valve assembly 121, 122. A respective fracture header 118, 128 couples the respective first valve assembly 111, 112 to the respective second valve assembly 121, 122.

Each respective first valve assembly 111, 112 includes a first manifold valve 113, 123 coupled to a second manifold valve 114, 124. Each second manifold valve 114, 124 is coupled to the respective fracture header 118, 128. Each respective second valve assembly 121, 122 includes a first frac valve 115, 125 coupled to a second frac valve 116, 126. Each second frac valve 116, 126 is coupled to the respective fracture header 118, 128. A respective swab valve 119, 129 is coupled to each respective fracture header 118, 128. Each first valve assembly 111, 112 includes, respectively, a first bottom block 131 and a second bottom block 141. Each second valve assembly 121, 122 includes a respective adaptor flange 132, 142 that is configured to couple to the respective well.

Each of the wellhead structures 101, 102 is configured to couple to a pump manifold, such as a frac manifold to pump operations fluids (such as frac fluids) downhole into the wells.

The present disclosure contemplates that additional wellhead structures can be included to fluidly connect to additional wells. Spool assemblies 180 are coupled to and between the wellhead structures 101, 102. In one embodiment, which can be combined with other embodiments, a wellbore treatment operation using the wellhead system 100 shown in FIG. 1 may further include connecting each wellhead structure 101, 102 to a respective well. The wellbore treatment operation may further include connecting each bottom block 131, 141 to the spool assemblies 180. Each bottom block 131, 141 may be a manifold header.

The wellbore treatment operation may further include pumping treatment fluid through the spool assemblies 180, sequentially through each wellhead structure 101, 102, and into each well. The wellbore treatment operation may include sequentially pumping treatment fluid into each well such that the treatment fluid is pumped into each well in turn, one well at a time. The wellbore treatment operation may further include closing the first and second manifold valves 113 or 123 (and/or 114 or 124) of the first valve assembly 111 or 112 associated with the well that is not to receive the treatment fluid, and opening the first and second manifold valves 113 or 123 (and/or 114 or 124) of the first valve assembly 111 or 112 associated with the well that is to receive the treatment fluid. The wellbore treatment operation may further include closing the first and second manifold valves 113 or 123 (and/or 114 or 124) of the first valve assembly 111 or 112 associated with the well that received the treatment fluid, and opening the first and second manifold valves 113 or 123 (and/or 114 or 124) of the first valve assembly 111 or 112 associated with another well that is about to receive the treatment fluid. The wellbore treatment operation may thus include using the sequential closing and opening of first and second manifold valves 113 or 123 (and/or 114 or 124) of each first valve assembly 111 or 112 to direct the treatment fluid into each well sequentially.

Figure 2:
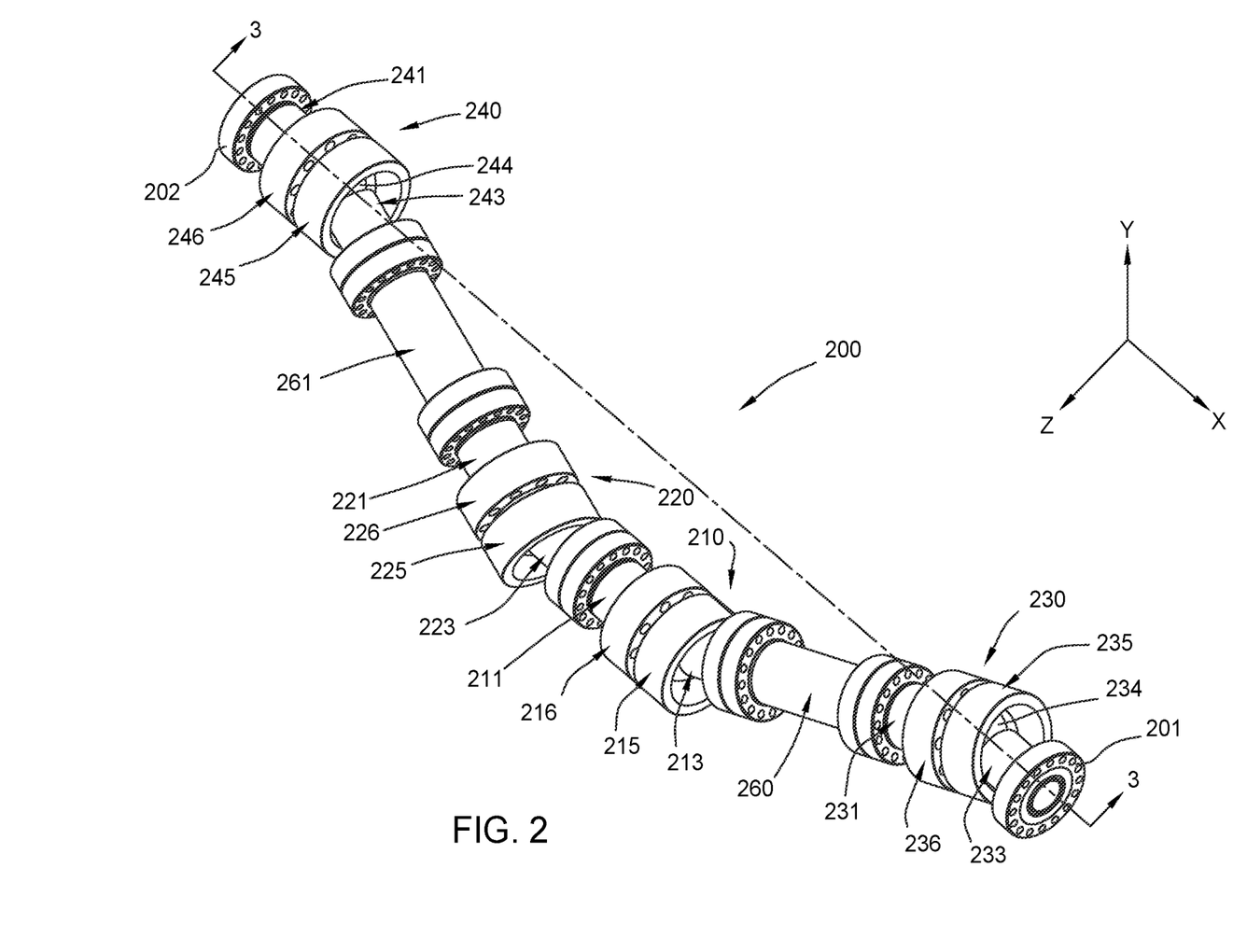
FIG. 2 is a schematic isometric view of a spool assembly, according to one implementation.
Figure 3:
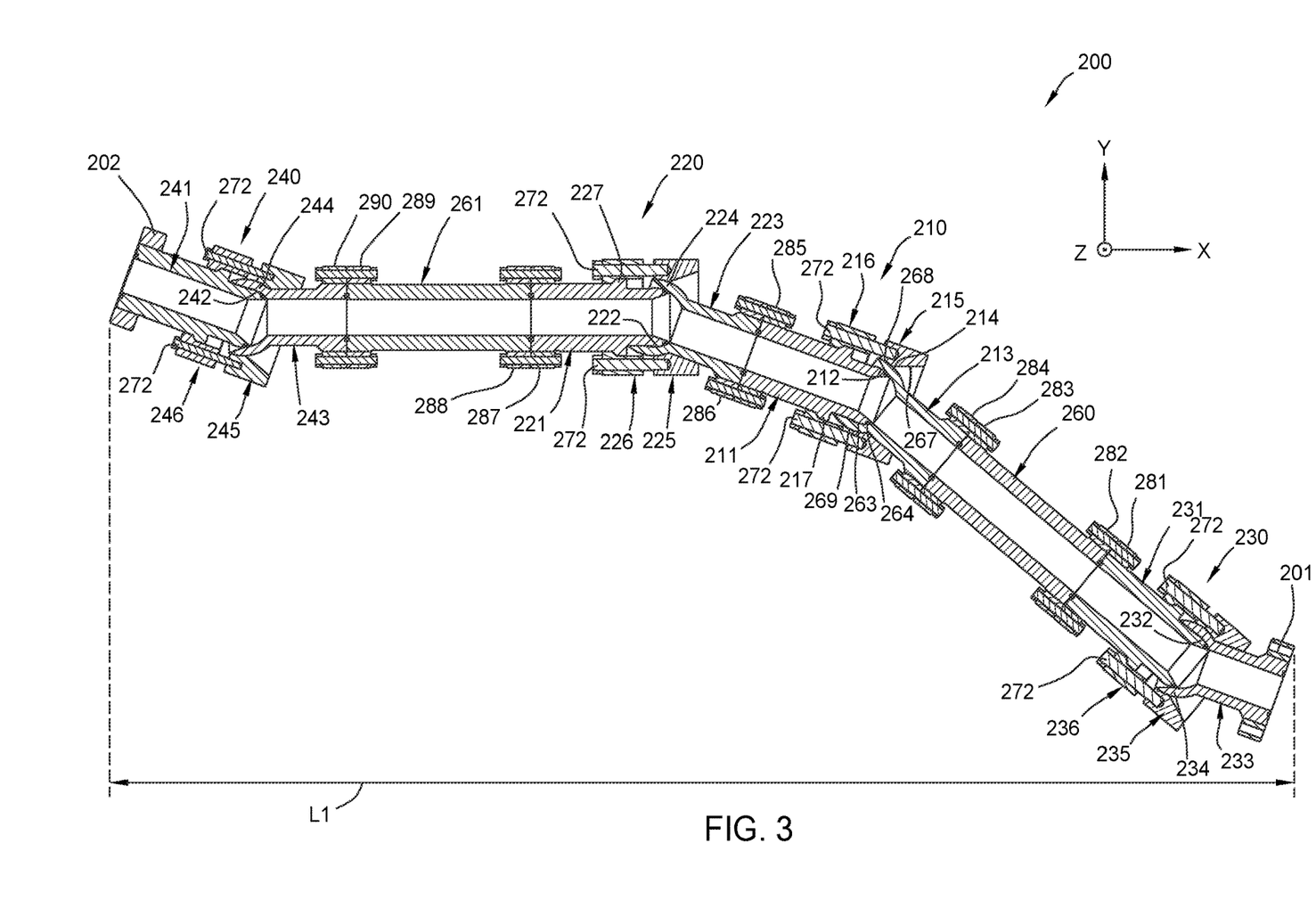
FIG. 3 is a schematic cross-sectional top view, taken along section 3-3, of the spool assembly shown in FIG. 2, according to one implementation.

FIG. 2 is a schematic isometric view of a spool assembly 200, according to one implementation. The spool assembly 200 may be the same as the spool assemblies 180 shown in FIG. 1. FIG. 3 is a schematic cross-sectional top view, taken along section 3-3, of the spool assembly 200 shown in FIG. 2, according to one implementation.

The spool assembly 200 is configured to be disposed between two wellhead structures (such as between the two wellhead structures 101, 102 shown in FIG. 1). The spool assembly 200 includes a first end flange 201, a second end flange 202, and one or more pivotable connections 210, 220, 230, 240 (four are shown) positioned between the first end flange 201 and the second end flange 202. Each respective pivotable connection 210, 220, 230, 240 of the one or more pivotable connections 210, 220, 230, 240 includes a connection tubular 211, 221, 231, 241 having an outer spherical surface 212, 222, 232, 242, and a bearing tubular 213, 223, 233, 243 having a spherical end 214, 224, 234, 244 disposed about the outer spherical surface 212, 222, 232, 242 of the respective connection tubular 211, 221, 231, 241.

Each respective pivotable connection 210, 220, 230, 240 includes a socket flange tubular 215, 225, 235, 245 disposed about the spherical end 214, 224, 234, 244 of the respective bearing tubular 213, 223, 233, 243, and a shoulder flange tubular 216, 226, 236, 246 disposed about an outer shoulder 217, 227, 237, 247 of the respective connection tubular 211, 221, 231, 241. The shoulder flange tubular 216, 226, 236, 246 of each pivotable connection 210, 220, 230, 240 is coupled to the respective socket flange tubular 215, 225, 235, 245.

As shown in FIGS. 2 and 3, the one or more pivotable connections 210, 220, 230, 240 include a first pivotable connection 210, a second pivotable connection 220, a third pivotable connection 230, and a fourth pivotable connection 240. The first pivotable connection 210 includes a first bearing tubular 213 and a first connection tubular 211 interfacing with the first bearing tubular 213. The first bearing tubular 213 includes a first spherical end 214. The first pivotable connection 210 includes a first socket flange tubular 215 disposed about the first spherical end 214 of the first bearing tubular 213, and a first shoulder flange tubular 216 disposed about a first outer shoulder 217 of the first connection tubular 211. The first shoulder flange tubular 216 is coupled to the first socket flange tubular 215.

The second pivotable connection 220 includes a second bearing tubular 223 and a second connection tubular 221 interfacing with the second bearing tubular 223. The second bearing tubular 223 includes a second spherical end 224 disposed about the outer spherical surface 222 of the second connection tubular 221. The second pivotable connection 220 includes a second socket flange tubular 225 disposed about the second spherical end 224 of the second bearing tubular 223, and a second shoulder flange tubular 226 disposed about a second outer shoulder 227 of the second connection tubular 221. The second shoulder flange tubular 226 is coupled to the second socket flange tubular 225.

The third pivotable connection 230 includes a third bearing tubular 233 and a third connection tubular 231 interfacing with the third bearing tubular 233. The fourth pivotable connection 240 includes a fourth bearing tubular 243 and a fourth connection tubular 241 interfacing with the fourth bearing tubular 243.

Each spherical end 214, 224, 234, 244 includes an inner spherical surface 263 having a first radius of curvature that is within a difference of 5 percent or less relative to a second radius of curvature of the outer spherical surface 212 of each respective connection tubular 211, 221, 231, 241 with which the respective spherical end 214, 224, 234, 244 interfaces. The first pivotable connection 210 includes a first inner seal 264 disposed between the inner spherical surface 263 of the first spherical end 214 and the outer spherical surface 212 of the first connection tubular 211.

The first socket flange tubular 215 includes a tapered inner surface 267 and an inner spherical surface 268 intersecting the tapered inner surface 267. The inner spherical surface 268 of the first socket flange tubular 215 interfaces with an outer spherical surface 269 of the first spherical end 214. The inner spherical surface 268 of the first socket flange tubular 215 has a third radius of curvature that is within a difference of 5 percent or less relative to a fourth radius of curvature of the outer spherical surface 269 of the first spherical end 214. A plurality of fasteners 272 are disposed through the first shoulder flange tubular 216 and partially into the first socket flange tubular 215. Each respective pivotable connection 210, 220, 230, 240 is a ball joint that includes the interface of the respective spherical end 214, 224, 234, 244 with the respective outer spherical surface 212, 222, 232, 242.

In the implementation shown in FIGS. 2 and 3, the third bearing tubular 233 is a first end tubular and the fourth connection tubular 241 is a second end tubular.

The spool assembly 200 includes one or more first intermediate tubulars 260 (one is shown although any number of intermediate tubulars may be used) positioned between the first pivotable connection 210 and the third bearing tubular 233, and one or more second intermediate tubulars 261 (one is shown although any number of intermediate tubulars may be used) positioned between the second pivotable connection 220 and the fourth connection tubular 241. A first intermediate tubular 260 is coupled between the third connection tubular 231 and the first bearing tubular 213. A second intermediate tubular 261 is coupled between the second connection tubular 221 and the fourth bearing tubular 243. Each first intermediate tubular 260 and second intermediate tubular 261 is a spool having a length within a range of 2.0 feet to 4.0 feet, such as 3.0 feet.

A plurality of flanges 201, 202, 281-290 (such as flange rings) are threaded onto threaded outer surfaces of the connection tubulars 211, 221, 231, 241, the bearing tubulars 213, 223, 233, 243, and the intermediate tubulars 261, 262.

The first end flange 201 is configured to couple to the second bottom block 141 of the second wellhead structure 102, and the second end flange 202 is configured to couple to the first bottom block 131 of the first wellhead structure 101. The first end flange 201 and the second end flange 202 are API flanges. In one embodiment, which can be combined with other embodiments, the first end flange 201 is coupled to (such as threaded onto) the third bearing tubular 233 of the third pivotable connection 230. The third pivotable connection 230 is a first end pivotable connection of the spool assembly 200. In one embodiment, which can be combined with other embodiments, the second end flange 202 is coupled to (such as threaded onto) the fourth connection tubular 241 of the fourth pivotable connection 240. The fourth pivotable connection 240 is a second end pivotable connection of the spool assembly 200.

Each of the pivotable connections 210, 220, 230, 240 is pivotable in two or more planes and is pivotable about two or more axes. In one embodiment, which can be combined with other embodiments, each of the pivotable connections 210, 220, 230, 240 is pivotable in three planes (e.g., the X-Y plane, the X-Z plane, and the Y-Z plane). In one embodiment, which can be combined with other embodiments, each of the pivotable connections 210, 220, 230, 240 is pivotable about three axes (e.g., the X-axis, the Y-axis, and the Z-axis). For each pivotable connection 210, 220, 230, 240, each respective bearing tubular 213, 223, 233, 243 and each respective connection tubular 211, 221, 231, 241 are pivotable relative to each other. In one embodiment, which can be combined with other embodiments, at least one of the respective bearing tubular 213, 223, 233, 243 and/or the respective connection tubular 211, 221, 231, 241 for each pivotable connection 210, 220, 230, 240 is movable along all six degrees of freedom for the respective bearing tubular 213, 223, 233, 243 and/or the respective connection tubular 211, 221, 231, 241. In such an embodiment, the respective bearing tubular 213, 223, 233, 243 and/or the respective connection tubular 211, 221, 231, 241 is movable along the X-axis, along the Y-axis, along the Z-axis, about the X-axis, about the Y-axis, and/or about the Z-axis.

The spool assembly 200 has a weight that is less than 20,000 pounds, such as 19,000 pounds or less. The weight of the spool assembly 200 is relatively low and facilitates moving the spool assembly 200 at a wellsite using simple equipment, such as a forklift. In one embodiment, which can be combined with other embodiments, the spool assembly 200 is supported on a skid structure, and the skid structure is lifted and moved using a forklift. The reduced weight of the spool assembly 200 facilitates ease of transportation of the spool assembly 200, and facilitates reduced costs for operations.

The components 211, 213, 215, 216, 221, 223, 225, 226, 231, 233, 235, 236, 241, 243, 245, 246, 260, and 261 of the spool assembly 200 are formed of a metal, such as steel or aluminum. The spool assembly 200 facilitates a resilience to operational conditions, such as abrasive materials flowing through the spool assembly 200 and wellhead structures.

The pivoting of the pivotable connections 210, 220, 230, 240 facilitates accounting for a large variance in a length L1 of the spool assembly 200, which facilitates accounting for varying spacing distances between wellhead structures which the spool assembly 200 fluidly connects together. In one embodiment, which can be combined with other embodiments, the spool assembly 200 can vary in the length L1 by more than 6.0 inches, such as 7.0625 inches. The accounting for variances facilitates reduced costs and reduced operational delays. The pivoting of the pivotable connections 210, 220, 230, 240 shortens or lengthens the length L1 of the spool assembly 200.

The pivoting of the pivotable connections 210, 220, 230, 240 facilitates increased durability and increased operational lifespans for the spool assembly 200. As an example, the pivoting reduces and/or eliminates repeated elastic straining and/or instances of plastic straining of components of the spool assembly 200.

Figure 4:
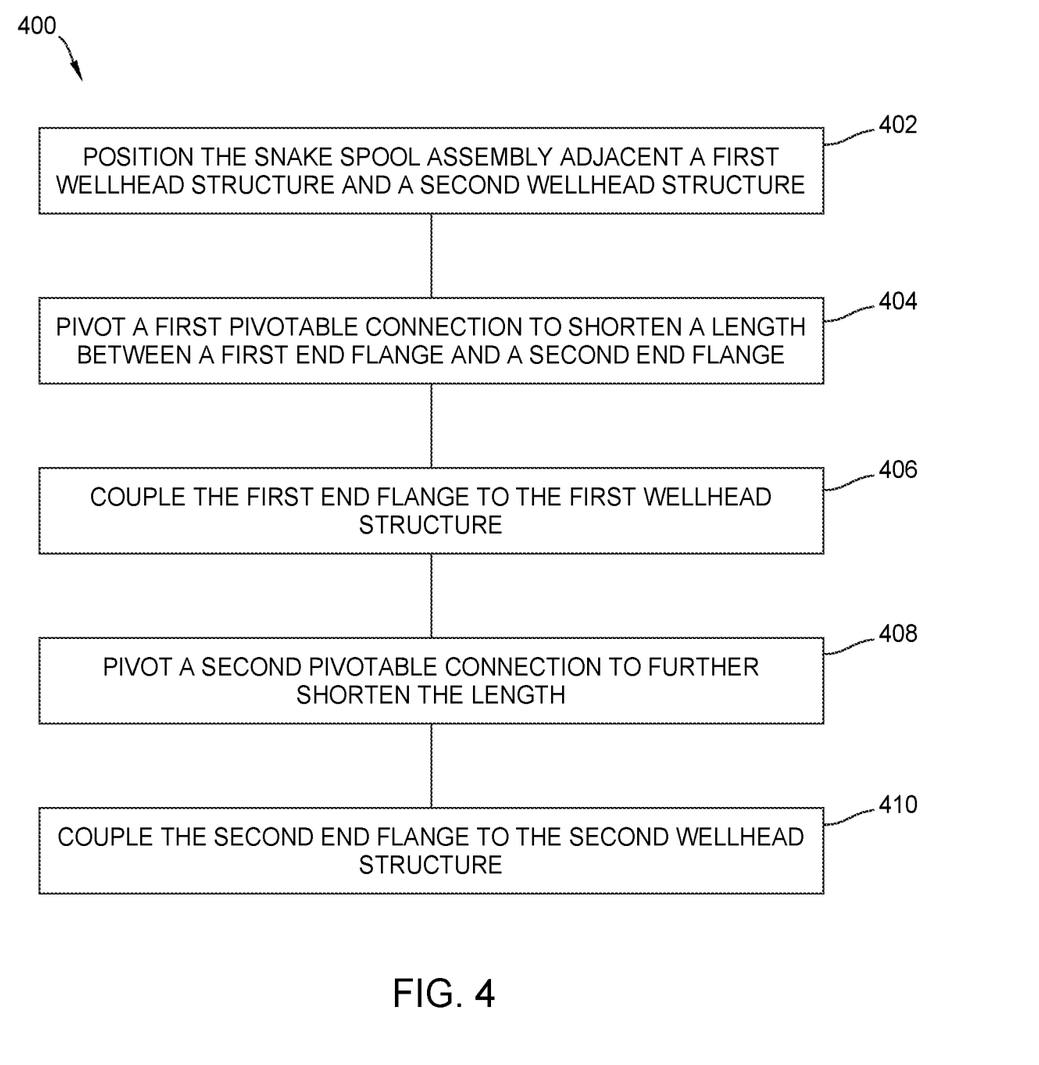
FIG. 4 is a schematic block diagram view of a method of installing a spool assembly at a wellsite, according to one implementation.

FIG. 4 is a schematic block diagram view of a method 400 of installing a spool assembly at a wellsite, according to one implementation.

Operation 402 includes positioning the spool assembly adjacent a first wellhead structure and a second wellhead structure. In one embodiment, which can be combined with other embodiments, the positioning of the spool assembly includes moving the spool assembly while the spool assembly is supported by a forklift.

Operation 404 includes pivoting a first pivotable connection of the spool assembly to shorten a length between a first end flange and a second end flange of the spool assembly. The pivoting of the first pivotable connection includes pivoting a first spherical end of a first bearing tubular about an outer spherical surface of a first connection tubular.

Operation 406 includes coupling the first end flange of the spool assembly to the first wellhead structure. In one embodiment, which can be combined with other embodiments, the coupling includes fastening the first end flange to the first wellhead structure using one or more fasteners, such as one or more threaded bolts and nuts, one or more screws, one or more threaded studs or pins, and/or one or more through-rods. In one embodiment, which can be combined with other embodiments, the first end flange is coupled to a first bottom block of a valve assembly of the first wellhead structure.

Operation 408 includes pivoting a second pivotable connection of the spool assembly to further shorten the length of the spool assembly. In one embodiment, which can be combined with other embodiments, the pivoting of the first pivotable connection of operation 404 and the pivoting of the second pivotable connection of operation 408 shortens the length of the spool assembly by more than 6.0 inches, such as 7.0625 inches. The pivoting of the second pivotable connection includes pivoting a second spherical end of a second bearing tubular about an outer spherical surface of a second connection tubular.

The present disclosure contemplates that the pivoting of operation 404 can include pivoting of a third pivotable connection of the spool assembly to shorten the length, and the pivoting of operation 408 can include pivoting of a fourth pivotable connection of the spool assembly to further shorten the length.

Operation 410 includes coupling the second end flange of the spool assembly to the second wellhead structure. In one embodiment, which can be combined with other embodiments, the coupling includes fastening the second end flange to the second wellhead structure using one or more fasteners, such as one or more threaded bolts and nuts, one or more screws, one or more threaded studs or pins, and/or one or more through-rods. In one embodiment, which can be combined with other embodiments, the second end flange is coupled to a second bottom block of a valve assembly of the second wellhead structure.

Benefits of the present disclosure include reduced weight, ease of transportation, modularity in use at various wellsites, operating across variances in spacing distances between wellhead structures, and resilience to operational conditions (such as abrasive conditions). Benefits of the present disclosure also include reduced operational delays, reduced costs, durability, and increased operating lifespans.

It is contemplated that one or more of the aspects disclosed herein may be combined. Moreover, it is contemplated that one or more of these aspects may include some or all of the aforementioned benefits. As an example, the present disclosure contemplates that one or more aspects, features, components, and/or properties of the wellhead system 100, the spool assembly 180, the spool assembly 200, and/or the method 400 may be combined.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The disclosure also contemplates that one or more aspects of the embodiments described herein may be substituted in for one or more of the other aspects described. The scope of the disclosure is determined by the claims that follow.

We claim:

1. A spool assembly for fluidly connecting wellhead structures, comprising:
    a first end tubular;
    a second end tubular;
    a first pivotable connection positioned between the first end tubular and the second end tubular, the first pivotable connection comprising:
        a first bearing tubular, and
        a first connection tubular interfacing with the first bearing tubular;
    a first intermediate tubular positioned between the first pivotable connection and the first end tubular;
    a second pivotable connection positioned between the first end tubular and the second end tubular, the second pivotable connection comprising:
        a second connection tubular, and
        a second bearing tubular interfacing with the second connection tubular; and
    a second intermediate tubular positioned between the second pivotable connection and the second end tubular.

2. The spool assembly of claim 1, wherein the first end tubular comprises a first end flange configured to couple to a first wellhead structure, and the second end tubular comprises a second end flange configured to couple to a second wellhead structure.

3. The spool assembly of claim 1, wherein the first bearing tubular comprises a first spherical end disposed about an outer spherical surface of the first connection tubular.

4. The spool assembly of claim 3, wherein the first spherical end comprises an inner spherical surface having a first radius of curvature that is within a difference of 5 percent or less relative to a second radius of curvature of the outer spherical surface of the first connection tubular.

5. The spool assembly of claim 4, wherein the first pivotable connection further comprises a first inner seal disposed between the inner spherical surface of the first spherical end and the outer spherical surface of the first connection tubular.

6. The spool assembly of claim 4, wherein the first pivotable connection further comprises:
    a first socket flange tubular disposed about the first spherical end of the first bearing tubular; and
    a first shoulder flange tubular disposed about a first outer shoulder of the first connection tubular, the first shoulder flange tubular coupled to the first socket flange tubular.

7. The spool assembly of claim 6, wherein the first socket flange tubular comprises a tapered inner surface and an inner spherical surface intersecting the tapered inner surface, wherein the inner spherical surface of the first socket flange tubular interfaces with an outer spherical surface of the first spherical end.

8. The spool assembly of claim 7, wherein the inner spherical surface of the first socket flange tubular has a third radius of curvature that is within a difference of 5 percent or less relative to a fourth radius of curvature of the outer spherical surface of the first spherical end.

9. The spool assembly of claim 6, wherein a plurality of fasteners are disposed through the first shoulder flange tubular and partially into the first socket flange tubular.

10. The spool assembly of claim 6, wherein the second bearing tubular comprises a second spherical end disposed about an outer spherical surface of the second connection tubular.

11. The spool assembly of claim 10, wherein the second pivotable connection further comprises:
    a second socket flange tubular disposed about the second spherical end of the second bearing tubular; and a second shoulder flange tubular disposed about a second outer shoulder of the second connection tubular, the second shoulder flange tubular coupled to the second socket flange tubular.

12. A method of installing the spool assembly of claim 1 at a wellsite, comprising:

positioning the spool assembly adjacent a first wellhead structure and a second wellhead structure;

pivoting the first pivotable connection of the spool assembly to shorten a length between a first end flange and a second end flange of the spool assembly;

coupling the first end flange of the spool assembly to the first wellhead structure;

pivoting the second pivotable connection of the spool assembly to further shorten the length; and coupling the second end flange of the spool assembly to the second wellhead structure.

13. The method of claim 12, wherein the positioning of the spool assembly comprises moving the spool assembly while the spool assembly is supported by a forklift.

14. The method of claim 12, wherein the first end flange is coupled to a first bottom block of a valve assembly of the first wellhead structure, and the second end flange is coupled to a second bottom block of a valve assembly of the second wellhead structure.

15. The method of claim 12, wherein the pivoting of the first pivotable connection and the second pivotable connection shortens the length by more than 6.0 inches.

16. The method of claim 12, wherein the pivoting of the first pivotable connection comprises pivoting a first spherical end of the first bearing tubular about an outer spherical surface of the first connection tubular.

17. The method of claim 16, wherein the pivoting of the second pivotable connection comprises pivoting a second spherical end of the second bearing tubular about an outer spherical surface of the second connection tubular.

18. A spool assembly for fluidly connecting wellhead structures, comprising:

a first end flange;

a second end flange;

a pivotable connection positioned between the first end flange and the second end flange, the pivotable connection comprising:

a connection tubular comprising an outer spherical surface, a bearing tubular comprising a spherical end disposed about the outer spherical surface of the connection tubular, a socket flange tubular disposed about the spherical end of the bearing tubular, and a shoulder flange tubular disposed about an outer shoulder of the connection tubular, the shoulder flange tubular coupled to the socket flange tubular;

an intermediate tubular positioned between the pivotable connection and the first end flange;

a second pivotable connection positioned between the first end flange and the second end flange, the second pivotable connection comprising:

a second connection tubular comprising an outer spherical surface, a second bearing tubular comprising a spherical end disposed about the outer spherical surface of the second connection tubular, a second socket flange tubular disposed about the spherical end of the second bearing tubular, and a second shoulder flange tubular disposed about an outer shoulder of the second connection tubular, the second shoulder flange tubular coupled to the second socket flange tubular; and a second intermediate tubular positioned between the second pivotable connection and the second end flange.

19. The spool assembly of claim 18, wherein the first end flange is coupled to the bearing tubular of a first end pivotable connection of the pivotable connection.

20. The spool assembly of claim 19, wherein the second end flange is coupled to the second connection tubular of a second end pivotable connection of the second pivotable connection.

* * * * *